United States Patent
Usui et al.

(10) Patent No.: US 11,161,419 B2
(45) Date of Patent: Nov. 2, 2021

(54) HUMAN-POWERED VEHICLE CONTROL DEVICE

(71) Applicant: Shimano Inc., Osaka (JP)

(72) Inventors: Makoto Usui, Osaka (JP); Takafumi Suzuki, Osaka (JP)

(73) Assignee: Shimano Inc., Osaka (JP)

( * ) Notice: Subject to any disclaimer, the term of this patent is extended or adjusted under 35 U.S.C. 154(b) by 364 days.

(21) Appl. No.: 16/414,152

(22) Filed: May 16, 2019

(65) Prior Publication Data

US 2019/0359069 A1  Nov. 28, 2019

(30) Foreign Application Priority Data

May 25, 2018  (JP) .............................. JP2018-100756

(51) Int. Cl.
| | |
|---|---|
| *B60L 15/30* | (2006.01) |
| *B60L 15/20* | (2006.01) |
| *B60L 50/20* | (2019.01) |
| *B62M 6/45* | (2010.01) |
| *B62J 6/02* | (2020.01) |

(Continued)

(52) U.S. Cl.
CPC ........... *B60L 15/2054* (2013.01); *B60L 15/30* (2013.01); *B60L 50/20* (2019.02); *B60L 50/66* (2019.02); *B62J 6/02* (2013.01); *B62J 6/04* (2013.01); *B62M 6/45* (2013.01); *B60L 2200/12* (2013.01)

(58) Field of Classification Search
CPC ...... B60L 15/2054; B60L 15/30; B60L 50/20; B60L 50/66; B60L 2200/12; B62M 6/45; B62M 9/122; B62M 6/55; B62J 6/02; B62J 6/04; B62J 50/00; Y02T 10/70; Y02T 10/64; Y02T 10/72

See application file for complete search history.

(56) References Cited

U.S. PATENT DOCUMENTS

| 9,821,882 B2 * | 11/2017 | Matsuda ................. B60L 53/80 |
| 2016/0311491 A1 * | 10/2016 | Watarai .................. H05B 47/19 |

(Continued)

FOREIGN PATENT DOCUMENTS

| CN | 102673421 A | 9/2012 |
| CN | 205985247 U | 2/2017 |
| CN | 108016562 A | 5/2018 |

(Continued)

*Primary Examiner* — Kevin Hurley
*Assistant Examiner* — Marlon A Arce
(74) *Attorney, Agent, or Firm* — Global IP Counselors, LLP

(57) ABSTRACT

A human-powered vehicle control device includes an electronic controller and a first operating portion. The first operating portion operates a human-powered vehicle device. The electronic controller controls a supply of electric power from a battery to the human-powered vehicle device in a first mode. The electronic controller controls the electric power supplied from the battery to the human-powered vehicle device in a second mode to be less than the electric power supplied in the first mode. The electronic controller switches the first mode to the second mode upon determining the first operating portion has been operated by a first action while in the first mode. The electronic controller does not switch from the second mode to the first mode upon determining the first operating portion has been operated by the first action while in the second mode.

20 Claims, 9 Drawing Sheets

(51) Int. Cl.
*B62J 6/04* (2020.01)
*B60L 50/60* (2019.01)

(56) References Cited

U.S. PATENT DOCUMENTS

2019/0031283 A1* 1/2019 Suzuki .................... B62M 6/50
2019/0152560 A1* 5/2019 Iino ........................ B62M 9/122

FOREIGN PATENT DOCUMENTS

JP        2011-240919 A    12/2011
JP        2014-240258 A    12/2014

* cited by examiner

HUMAN-POWERED VEHICLE CONTROL DEVICE

CROSS-REFERENCE TO RELATED APPLICATIONS

This application claims priority to Japanese Patent Application No. 2018-100756, filed on May 25, 2018. The entire disclosure of Japanese Patent Application No. 2018-100756 is hereby incorporated herein by reference.

BACKGROUND

Technical Field

The present invention generally relates to a human-powered vehicle control device.

Background Information

Japanese Laid-Open Patent Publication No. 2011-240919 (Patent document 1) discloses a human-powered vehicle that includes an electric motor and a battery suppling electric power to the electric motor. The electric motor assists human driving force that is input to the crank at a predetermined assist ratio.

SUMMARY

In addition to the assisting electric motor, the human-powered vehicle can include a human-powered vehicle device, that is, a device actuated by electric power from the battery. For example, in a case in which a person carries the human-powered vehicle, the human-powered vehicle device of the human-powered vehicle is deactivated. In this state, it is preferred that actuation of the human-powered vehicle device be limited in a case in which an operation portion of the human-powered vehicle is operated to actuate the human-powered vehicle device.

One object of the present disclosure is to provide a human-powered vehicle control device that appropriately controls the supply of electric power from a battery to a human-powered vehicle device.

A human-powered vehicle control device according to a first aspect of the present disclosure comprises an electronic controller configured to control a supply of electric power from a battery to a human-powered vehicle device and a first operating portion that operates the human-powered vehicle device. The electronic controller is further configured to control the supply of electric power supplied from the battery to the human-powered vehicle device in a first mode. The electronic controller is further configured to control the supply of the electric power supplied from the battery to the human-powered vehicle device while in a second mode to be less as compared to the electric power supplied in the first mode. The electronic controller is further configured to switch from the first mode to the second mode upon determining the first operating portion has been operated by a first action while in the first mode The electronic controller is further configured not to switch from the second mode to the first mode upon determining the first operating portion has been operated by the first action while in the second mode.

With the human-powered vehicle control device according to the first aspect, even in a case in which the first operating portion is operated by the first action, which switches from the first mode to the second mode, in the second mode, the second mode will not be switched to the first mode. For example, in a case in which the human-powered vehicle is carried and the second mode is set, actuation of the human-powered vehicle device with the operation of the first operating portion is limited. Thus, the human-powered vehicle control device appropriately controls the supply of electric power from the battery to the human-powered vehicle device.

In accordance with a second aspect of the present disclosure, the human-powered vehicle control device according to the first aspect is configured so that the human-powered vehicle device includes at least one of an electric actuator for a transmission included in a human-powered vehicle, a lighting device provided on the human-powered vehicle, an electric suspension included in the human-powered vehicle, an adjustable seatpost included in the human-powered vehicle, and an electric actuator that assists in propulsion of the human-powered vehicle.

With the human-powered vehicle control device according to the second aspect, actuation of at least one of the electric actuator for the transmission, the lighting device, the electric suspension, the adjustable seatpost, and the electric actuator that assists propulsion of the human-powered vehicle with the operation of the first operating portion is limited in the second mode.

In accordance with a third aspect of the present disclosure, the human-powered vehicle control device according to the first or second aspect is configured so that the electronic controller is further configured to control the human-powered vehicle device upon determining the first operating portion has been operated by a second action that differs from the first action while in the first mode.

With the human-powered vehicle control device according to the third aspect, the switching from the first mode to the second mode and the control of the human-powered vehicle device are both performed by operation of the first operating portion. The operation of the first operating portion for switching from the first mode to the second mode differs from the operation of the first operating portion for controlling the human-powered vehicle device. Thus, in a case in which the user operates the first operating portion to control the human-powered vehicle device, occurrence of an erroneous operation such as the switching from the first mode to the second mode is limited.

In accordance with a fourth aspect of the present disclosure, the human-powered vehicle control device according to the third aspect is configured so that the human-powered vehicle device includes a rear derailleur and an electric actuator. The rear derailleur includes a movable portion and a fixed portion. The electronic controller is further configured to control the electric actuator to change an initial position of the movable portion relative to the fixed portion upon determining the first operating portion has been operated by the second action while in the first mode.

With the human-powered vehicle control device according to the fourth aspect, the position of the movable portion relative to the fixed portion of the rear derailleur is changed to an appropriate position in accordance with the second action of the first operating portion.

In accordance with a fifth aspect of the present disclosure, the human-powered vehicle control device according to the third or fourth aspect is configured so that the first operating portion includes a single operating part, and the electronic controller is further configured to distinguish the first action and the second action based on a number of times the first operating portion is operated, which differs between the first action and the second action.

With the human-powered vehicle control device according to the fifth aspect, the switching from the first mode to the second mode and the control of the human-powered vehicle device are performed by the different numbers of times the first operating portion is operated.

In accordance with a sixth aspect of the present disclosure, the human-powered vehicle control device according to the third or fourth aspect is configured so that the first operating portion includes a plurality of operating parts, and the electronic controller is further configured to distinguish the first action and the second action based on an operating procedure for operating the operating parts, which differs between the first action and the second action.

With the human-powered vehicle control device according to the sixth aspect, the switching from the first mode to the second mode and the control of the human-powered vehicle device are performed by the different procedures for operating the first operating portion.

In accordance with a seventh aspect of the present disclosure, the human-powered vehicle control device according to any one of the third to sixth aspects is configured so that the electronic controller is further configured to distinguish the first action and the second action based on an operation time of the first operating portion, which differs between the first action and the second action.

With the human-powered vehicle control device according to the seventh aspect, the switching from the first mode to the second mode and the control of the human-powered vehicle device are performed by the different operation times of the first operating portion.

In accordance with an eighth aspect of the present disclosure, the human-powered vehicle control device according to any one of the first to seventh aspects is configured so that the electronic controller is further configured to switch from the second mode to the first mode upon determining a second operating portion that differs from the first operating portion is operated by a third action while in the second mode.

With the human-powered vehicle control device according to the eighth aspect, switching from the second mode to the first mode caused by an unintentional operation of the first operating portion is limited.

In accordance with a ninth aspect of the present disclosure, the human-powered vehicle control device according to any one of the first to eighth aspects is configured so that the electronic controller is further configured to switch from the second mode to the first mode upon determining a charger is electrically connected to one of the battery and the human-powered vehicle device.

With the human-powered vehicle control device according to the ninth aspect, switching from the second mode to the first mode caused by an unintentional operation of the first operating portion is limited.

In accordance with a tenth aspect of the present disclosure, the human-powered vehicle control device according to any one of the first to ninth aspects is configured so that the electronic controller is further configured to select between a first state and a second state while in the second mode. The electronic controller is further configured not to switch from the second mode to the first mode in a case in which the first operating portion is operated by the first action while in the first state. The electronic controller is further configured to switch from the second mode to the first mode in a case in which the first operating portion is operated by the first action while in the second state.

With the human-powered vehicle control device according to the tenth aspect, in a case in which the controller is in the first state, actuation of the human-powered vehicle device with the operation of the first operating portion is limited in the second mode. In a case in which the controller is in the second state, the second mode is switched to the first mode by operation of the first operating portion. Thus, actuation of the human-powered vehicle device with the operation of the first operating portion is limited. The first state and the second state allow for selection between a state that limits actuation of the human-powered vehicle device with operation of the first operating portion and a state that allows the actuation of the human-powered vehicle device. This increases the convenience for the user.

A human-powered vehicle control device according to an eleventh aspect of the present disclosure comprises an electronic controller that is configured to switch between a first mode and a second mode. The electronic controller is further configured to control a supply of electric power supplied from a battery to a human-powered vehicle device that includes at least one of an electric actuator, a front light, and a tail light while in the first mode. The electronic controller is further configured to control the supply of the electric power supplied from the battery to at least one of the electric actuator, the front light, and the tail light in the second mode to be less as compared to the electric power supplied in the first mode while in the second mode. The electronic controller is further configured to switch from the second mode to the first mode upon determining a charger is connected to the battery.

With the human-powered vehicle control device according to the eleventh aspect, the second mode will not be switched to the first mode unless the charger is connected to the battery. For example, in a case in which the human-powered vehicle is carried and the second mode is set, actuation of the human-powered vehicle device is limited. Thus, the human-powered vehicle control device appropriately controls the supply of electric power from the battery to the human-powered vehicle device.

In accordance with a twelfth aspect of the present disclosure, the human-powered vehicle control device according to the eleventh aspect is configured so that the electric actuator is configured to actuate a transmission.

With the human-powered vehicle control device according to the twelfth aspect, actuation of the transmission is limited in the second mode.

In accordance with a thirteenth aspect of the present disclosure, the human-powered vehicle control device according to the eleventh or twelfth aspect further comprises a first operating portion that switches from the first mode to the second mode. The electronic controller is further configured not to switch from the first mode to the second mode in accordance with operation of the first operating portion while in the second mode.

With the human-powered vehicle control device according to the thirteenth aspect, actuation of the human-powered vehicle device with the operation of the first operating portion is limited in the second mode.

In accordance with a fourteenth aspect of the present disclosure, the human-powered vehicle control device according to the thirteenth aspect further comprises a second operating portion that switches from the second mode to the first mode and differs from the first operating portion. The electronic controller is further configured to switch from the second mode to the first mode in accordance with operation of the second operating portion while in the second mode.

With the human-powered vehicle control device according to the fourteenth aspect, switching from the second mode to the first mode caused by an unintentional operation of the first operating portion is limited.

In accordance with a fifteenth aspect of the present disclosure, the human-powered vehicle control device according to any one of the first to tenth, thirteenth, and fourteenth aspects is configured so that the first operating portion is mounted on a human-powered vehicle.

With the human-powered vehicle control device according to the fifteenth aspect, the first operating portion is configured to be mounted on the human-powered vehicle. This lowers the possibility of losing the first operating portion.

In accordance with a sixteenth aspect of the present disclosure, the human-powered vehicle control device according to any one of the first to fifteenth aspects is configured so that the electronic controller is further configured to switch from the first mode to the second mode in accordance with a first action from an external device.

With the human-powered vehicle control device according to the sixteenth aspect, the first mode can be switched to the second mode by the external device in addition to the first action of the first operating portion. This increases the convenience for the user.

In accordance with a seventeenth aspect of the present disclosure, the human-powered vehicle control device according to any one of the first to sixteenth aspects further comprises a drive circuit that drives the human-powered vehicle device. The second mode includes a third mode in which the battery energizes the drive circuit and energization between the drive circuit and the human-powered vehicle device is interrupted.

With the human-powered vehicle control device according to the seventeenth aspect, in the third mode, electric power is not supplied from the battery to the human-powered vehicle device. This limits actuation of the human-powered vehicle device. Thus, in a case in which the human-powered vehicle is carried and the second mode is set, the human-powered vehicle device will not be actuated. This allows the human-powered vehicle to be, for example, admitted as check-in luggage when boarding an aircraft.

In accordance with an eighteenth aspect of the present disclosure, the human-powered vehicle control device according to any one of the first to seventeenth aspects is configured so that the battery includes a lithium-ion battery.

With the human-powered vehicle control device according to the eighteenth aspect, the lithium-ion battery is appropriately used as the battery.

In accordance with a nineteenth aspect of the present disclosure, the human-powered vehicle control device according to any one of the first to eighteenth aspects is configured so that the battery is appropriately attachable to at least one of a seatpost, a movable portion of a rear derailleur, a fixed portion of the rear derailleur, and a frame of a human-powered vehicle.

With the human-powered vehicle control device according to the nineteenth aspect, the battery can be attached to at least one of the seatpost, the movable portion or the fixed portion of the rear derailleur, and the frame.

In accordance with a twentieth aspect of the present disclosure, the human-powered vehicle control device according to any one of the first to nineteenth aspects is configured so that the electronic controller is further configured not to supply the electric power from the battery to the human-powered vehicle device while in the second mode.

With the human-powered vehicle control device according to the twentieth aspect, in the second mode, electric power is not supplied from the battery to the human-powered vehicle device. This limits actuation of the human-powered vehicle device. Thus, in a case in which the human-powered vehicle is carried and the second mode is set, the human-powered vehicle will not be actuated. This allows the human-powered vehicle to be, for example, admitted as check-in luggage when boarding an aircraft.

The human-powered vehicle control device according to the present disclosure appropriately controls the supply of electric power from the battery to the human-powered vehicle device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A first embodiment of a human-powered vehicle control device 50 will now be described with reference to FIGS. 1 to 5. In the description hereafter, the human-powered vehicle control device 50 is simply referred to as the control device 50. The control device 50 is provided on a human-powered vehicle 10. The human-powered vehicle 10 is a vehicle that can be driven by at least human driving force. The number of wheels on the human-powered vehicle 10 is not limited. The human-powered vehicle 10 includes, for example, a monocycle and a vehicle having three or more wheels. The human-powered vehicle 10 includes, for example, various types of bicycles such as a mountain bike, a road bike, a city bike, a cargo bike, and a recumbent bike, and an electric assist bicycle (E-bike). In the embodiments described below, the human-powered vehicle 10 refers to a bicycle.

Figure 1:
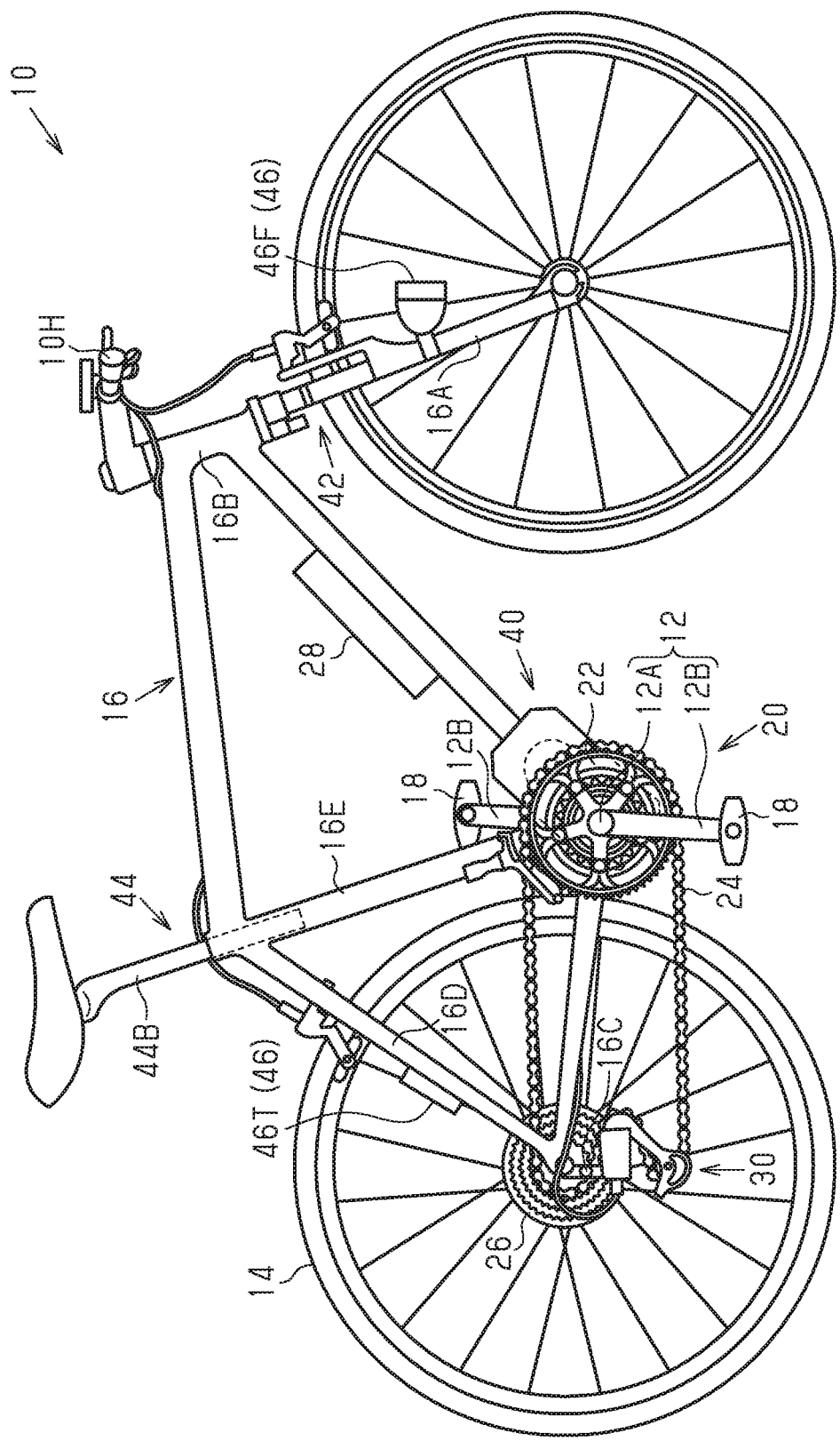
FIG. 1 is a side elevational view of a human-powered vehicle including a human-powered vehicle control device in accordance with a first embodiment.

As shown in FIG. 1, the human-powered vehicle 10 includes a crank 12 and a drive wheel 14. The human-powered vehicle 10 further includes a frame 16. Human driving force is input to the crank 12. The crank 12 includes a crankshaft 12A rotatable relative to the frame 16 and a pair of crank arms 12B provided on opposite ends of the crankshaft 12A in the axial direction. A pedal 18 is coupled to each of the crank arms 12B. The drive wheel 14 is driven in accordance with rotation of the crank 12. The drive wheel 14 is supported by the frame 16. The crank 12 and the drive wheel 14 are coupled by a drive mechanism 20. The drive mechanism 20 includes a first rotary body 22 coupled to the crankshaft 12A. The crankshaft 12A and the first rotary body 22 can be coupled via a first one-way clutch. The first one-way clutch is configured to allow forward rotation of the first rotary body 22 in a case in which the crank 12 rotates forward and prohibit rearward rotation of the first rotary body 22 in a case in which the crank 12 rotates rearward. The first rotary body 22 includes a sprocket, a pulley, or a bevel gear. The drive mechanism 20 further includes a coupling member 24 and a second rotary body 26. The coupling member 24 transmits rotational force of the first rotary body 22 to the second rotary body 26. The coupling member 24 includes, for example, a chain, a belt, or a shaft.

The second rotary body 26 is coupled to the drive wheel 14. The second rotary body 26 includes a sprocket, a pulley, or a bevel gear. Preferably, a second one-way clutch is provided between the second rotary body 26 and the drive wheel 14. The second one-way clutch is configured to allow forward rotation of the drive wheel 14 in a case in which the second rotary body 26 rotates forward and prohibit rearward rotation of the drive wheel 14 in a case in which the second rotary body 26 rotates rearward.

The human-powered vehicle 10 includes a front wheel and a rear wheel. The front wheel is coupled to the frame 16 via a front fork 16A. A handlebar 10H is coupled to the front fork 16A via a stem 16B. In the embodiments described below, the drive wheel 14 refers to the rear wheel. However, the front wheel can be the drive wheel 14.

The human-powered vehicle 10 includes a battery 28 and a transmission 30. The human-powered vehicle 10 further includes an assist device 40, an electric suspension 42, an adjustable seatpost 44, and a lighting device 46.

In one example, the battery 28 includes a lithium-ion battery. The battery 28 includes one or more battery cells. The battery cells include a rechargeable battery. In the present embodiment, the battery 28 is attached to the frame 16 of the human-powered vehicle 10. The battery 28 supplies electric power to other electric components that are electrically connected to the battery 28 by wires. The battery 28 can be attached to the exterior of the frame 16 or can be at least partially accommodated in the frame 16.

Figure 2:
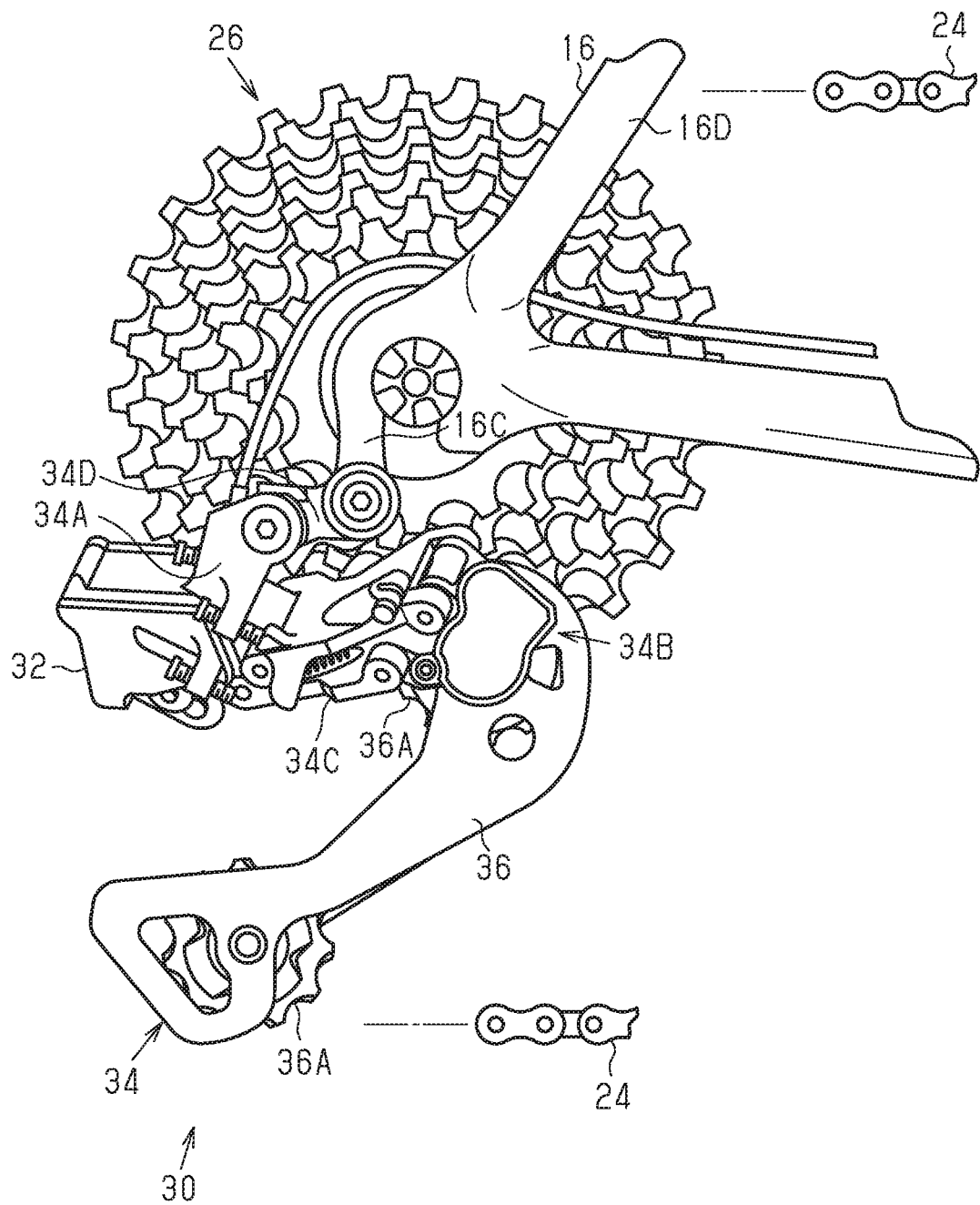
FIG. 2 is an enlarged side elevational view of a transmission of the human-powered vehicle shown in FIG. 1 and its surroundings.

The transmission 30 changes the transmission ratio of the human-powered vehicle 10. The transmission ratio is a ratio of rotation speed of the drive wheel 14 to rotation speed of the crank 12. As shown in FIG. 2, the transmission 30 includes an electric actuator 32 for the transmission 30 and a rear derailleur 34. The electric actuator 32 for the transmission 30 includes an electric motor. The transmission 30 moves the coupling member 24 between second rotary bodies 26 configured to provide different transmission ratios. The transmission 30 has shifting stages corresponding to the second rotary bodies 26. The transmission 30 is coupled to a derailleur hanger 16C of the frame 16 in the vicinity of the axle of the rear wheel.

The rear derailleur 34 includes a fixed portion 34A, a movable portion 34B and a link mechanism 34C. The fixed portion 34A is coupled to the frame 16 of the human-powered vehicle 10. The movable portion 34B is movable relative to the fixed portion 34A. The link mechanism 34C couples the fixed portion 34A and the movable portion 34B. The fixed portion 34A is configured to be coupled to the frame 16 with, for example, a bracket 34D and a bolt. The bracket 34D is fixed to the derailleur hanger 16C. The link mechanism 34C connects the fixed portion 34A and the movable portion 34B so that the movable portion 34B is movable relative to the fixed portion 34A. The movable portion 34B supports a guide member 36. The guide member 36 includes two pulleys 36A. The coupling member 24 runs on the two pulleys 36A.

The electric actuator 32 actuates the transmission 30 (rear derailleur 34) to change the transmission ratio. In one example, the electric actuator 32 moves the link mechanism 34C and the movable portion 34B relative to the fixed portion 34A. The transmission 30 changes the transmission ratio by moving the coupling member 24 between the second rotary bodies 26 in accordance with the driving of the electric actuator 32.

Figure 3:
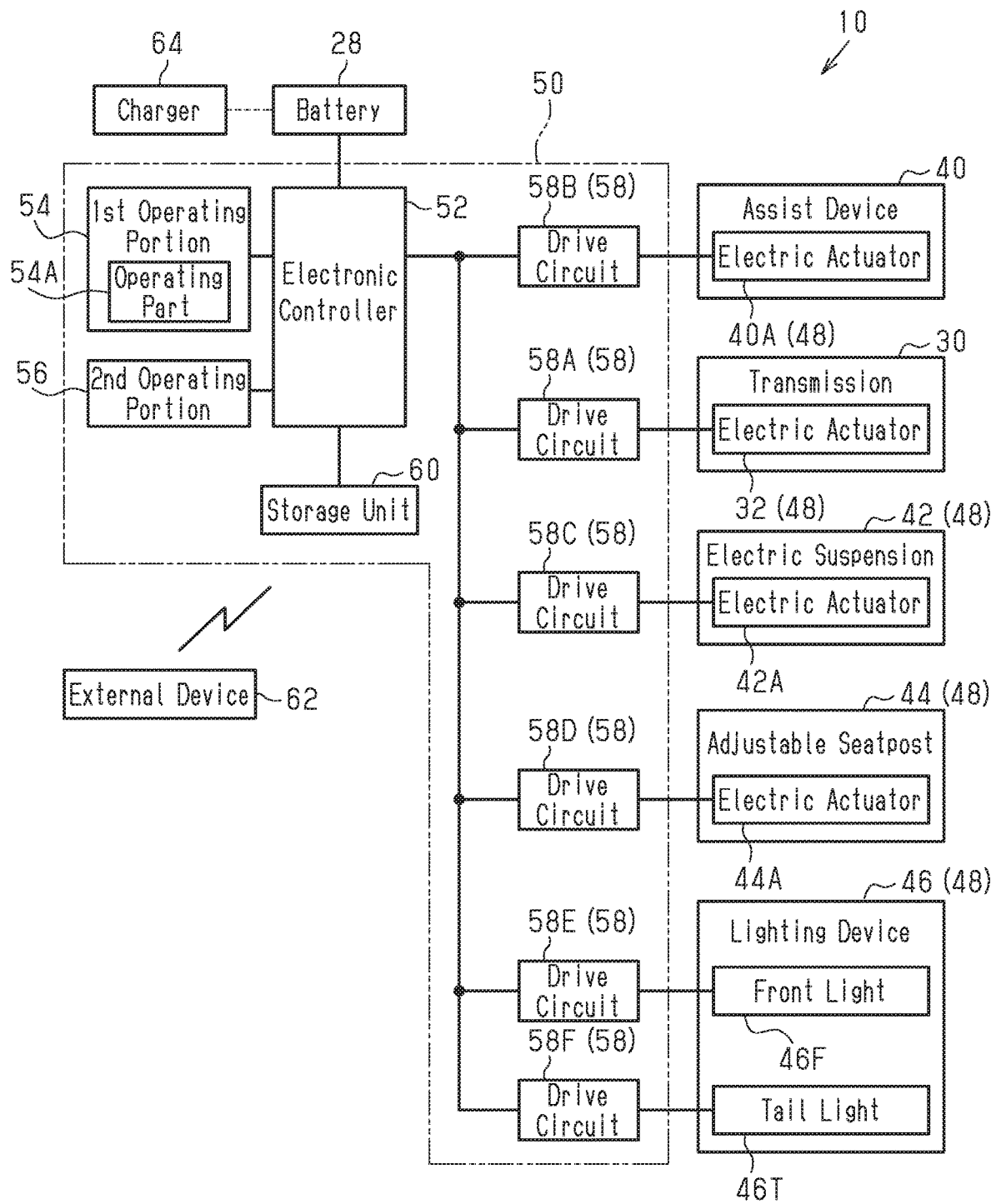
FIG. 3 is a block diagram showing one example of an electrical configuration of the human-powered vehicle shown in FIG. 1.

As shown in FIGS. 1 and 3, the assist device 40 includes an electric actuator 40A. The assist device 40 is provided on the frame 16. The electric actuator 40A includes an electric motor. The electric motor is provided to transmit rotation to the front wheel or a transmission path of human driving force extending from the pedals 18 to the rear wheel. The electric motor is provided on the frame 16 of the human-powered vehicle 10, the rear wheel, or the front wheel. In one example, the electric motor is coupled to the power transmission path between the crankshaft 12A and the first rotary body 22. Preferably, a one-way clutch is provided on the power transmission path between the electric motor and the crankshaft 12A so that in a case in which the crankshaft 12A is rotated in a direction that moves the human-powered vehicle 10 forward, the electric motor will not be rotated by the rotational force of the crank 12. The assist device 40 can include, for example, a speed reduction unit that reduces the speed of rotation of the electric motor and outputs the rotation.

One example of the electric suspension 42 is an electric front suspension provided on the front fork 16A to dampen an impact applied to the front wheel. The electric suspension 42 includes an electric actuator 42A. The electric suspension 42 is configured so that the damping ratio, the amount of stroke, and the lockout state are settable as operation parameters. The electric suspension 42 is configured to change the operation parameters in accordance with the driving of the electric actuator 42A. The electric suspension 42 can be an electric rear suspension that dampens an impact applied to the rear wheel. The electric suspension 42 can include both the electric front suspension and the electric rear suspension.

The adjustable seatpost 44 is provided on a seat tube 16E and configured to change the height of the seat. The adjustable seatpost 44 includes an electric actuator 44A. The adjustable seatpost 44 includes an electrical seatpost that extends and retracts a seatpost 44B with power of the electric actuator 44A or a mechanical seatpost that extends the seatpost 44B with force of at least a spring and air and retracts the seatpost 44B with application of human power. The mechanical seatpost includes a hydraulic seatpost or a hydraulic air pressure seatpost.

The lighting device 46 includes a front light 46F and a tail light 46T. The front light 46F is coupled to, for example, the front fork 16A. The tail light 46T is coupled to, for example, a seatstay 16D.

The human-powered vehicle 10 includes a human-powered vehicle device 48. The human-powered vehicle device 48 is a component that is driven in accordance with the supply of electric power from the battery 28. In one example, the human-powered vehicle device 48 includes at least one of the electric actuator 32 for the transmission 30 included in the human-powered vehicle 10, the lighting device 46 provided on the human-powered vehicle 10, the electric suspension 42 included in the human-powered vehicle 10, the adjustable seatpost 44 included in the human-powered vehicle 10, and the electric actuator 40A assisting in propulsion of the human-powered vehicle 10.

The human-powered vehicle 10 includes the control device 50 that controls the actuation of the human-powered vehicle device 48. The control device 50 includes an electronic controller 52 that controls the supply of electric power from the battery 28 to the human-powered vehicle device 48 and a first operating portion 54 that operates the human-powered vehicle device 48. In the description hereafter, the electronic controller 52 is simply referred to as the controller 52. In one example, the first operating portion 54 is mounted on the human-powered vehicle 10. The first operating portion 54 is preferably a user operable input device that a user can operate to operate the human-powered vehicle device 48. Examples of user operable input devices (the first operating portion 54) can include, for example, a button, a switch, a dial, etc. The control device 50 further includes a second operating portion 56 differing from the first operating portion 54.

Each of the first operating portion 54 and the second operating portion 56 is connected to the controller 52 through wired or wireless communication. In the case of wired communications, each of the first operating portion 54 and the second operating portion 56 is configured to communicate with the controller 52 through, for example, power line communication (PLC). The first operating portion 54 is mounted on the human-powered vehicle 10 in accordance with the kind of the human-powered vehicle device 48. In one example, in a case in which the human-powered vehicle device 48 includes the transmission 30, the first operating portion 54 includes a shifter. In a case in which the human-powered vehicle device 48 includes the electric actuator 40A of the assist device 40, the first operating portion 54 includes an operating part that operates to activate and deactivate the assist and change the assist ratio. In a case in which the human-powered vehicle device 48 includes the electric suspension 42, the first operating portion 54 includes an operating part that operates the operation parameters of the electric suspension 42. In a case in which the human-powered vehicle device 48 includes the adjustable seatpost 44, the first operating portion 54 includes an operating part that adjusts the length of the seatpost 44B of the adjustable seatpost 44. In a case in which the human-powered vehicle device 48 includes the front light 46F of the lighting device 46, the first operating portion 54 includes an operating part that turns the front light 46F on and off. In a case in which the human-powered vehicle device 48 includes the tail light 46T of the lighting device 46, the first operating portion 54 includes an operating part that turns the tail light 46T on and off. The second operating portion 56 includes, for example, a cycle computer.

The controller 52 includes an arithmetic processing unit that runs predetermined control programs. The arithmetic processing unit includes, for example, a central processing unit (CPU) or a micro processing unit (MPU). The controller 52 can include one or more microcomputers. The controller 52 is formed of one or more semiconductor chips that are mounted on a circuit board. The terms "electronic controller" and "controller" as used herein refer to hardware that executes a software program. The control device 50 includes a storage unit 60. The storage unit 60 stores information used in various control programs and various control processes. The storage unit 60 includes, for example, a nonvolatile memory and a volatile memory. The controller 52 can include the storage unit 60. The controller 52 is connected to the battery 28 through wired or wireless communication. The controller 52 is configured to communicate with the battery 28 through, for example, PLC.

The control device 50 further includes a drive circuit 58 that controls the supply of electric power to the human-powered vehicle device 48. In one example, the drive circuit 58 includes an inverter circuit including transistors. The drive circuit 58 includes drive circuits 58A to 58F. Each of the drive circuits 58A to 58F is connected to the controller 52 through wired or wireless communication. Each of the drive circuits 58A to 58F is configured to communicate with the controller 52 through, for example, PLC. Each of the drive circuits 58A to 58F is configured to communicate with the controller 52 through, for example, serial communication. In the description hereafter, in a case in which the drive circuits 58A to 58F are not specified, the drive circuits are referred to as "the drive circuit 58."

The drive circuit 58A controls electric power supplied from the battery 28 to the electric actuator 32 of the transmission 30. The drive circuit 58A drives the electric actuator 32 in accordance with a control signal from the controller 52.

The drive circuit 58B controls electric power supplied to the electric actuator 40A of the assist device 40 from the battery 28. The drive circuit 58B drives the electric actuator 40A in accordance with a control signal from the controller 52.

The drive circuit 58C controls electric power supplied from the battery 28 to the electric actuator 42A of the electric suspension 42. The drive circuit 58C actuates the electric actuator 42A to change the operation parameters in accordance with a control signal from the controller 52.

The drive circuit 58D controls electric power supplied from the battery 28 to the electric actuator 44A of the adjustable seatpost 44. In a case in which the adjustable seatpost 44 is an electrical seatpost, the drive circuit 58D supplies electric power to the electric actuator 44A, if operable, in accordance with a control signal from the controller 52. The electric actuator 44A supplied with the electric power extends and retracts the seatpost 44B via a mechanically-connected gear. The gear includes, for example, a rack and pinion. Preferably, in a case in which the adjustable seatpost 44 is an electrical seatpost, the seatpost 44B is configured to be raised and lowered by separate control signals. In a mechanical seatpost, the electric actuator 44A controls a valve that opens and closes an oil or air flow passage. In a case in which the adjustable seatpost 44 is a mechanical seatpost, the drive circuit 58D supplies electric power to the electric actuator 44A in accordance with a control signal from the controller 52. The electric actuator 44A supplied with the electric power opens the valve. In a state in which the valve is open, the seatpost 44B acts to extend with the force of at least one of a spring and air. In a state in which the valve is closed, the length of the seatpost 44B remains the same. In a case in which the adjustable seatpost 44 is a mechanical seatpost, the drive circuit 58D can supply electric power over a predetermined amount of time in response to reception of a control signal from the controller 52. In this case, the electric actuator 44A continues to open the valve for the predetermined amount of time. In a case in which the adjustable seatpost 44 is a mechanical seatpost, the drive circuit 58D can supply electric power from the time of receiving a control signal from the controller 52 until reception of the next control signal. In this case, the electric actuator 44A continues to open the valve from the reception of a control signal from the controller 52 until the reception of the next control signal.

The drive circuit 58E controls electric power supplied from the battery 28 to the front light 46F. In one example, the drive circuit 58E turns the front light 46F on or off in response to reception of a control signal from the controller 52.

The drive circuit 58F controls electric power supplied from the battery 28 to the tail light 46T. In one example, the drive circuit 58F turns the tail light 46T on or off in response to reception of a control signal from the controller 52.

The control performed by the controller 52 on the human-powered vehicle device 48 will now be described. Basically, in one embodiment, the controller 52 changes the amount of electric power supplied from the battery 28 to the human-powered vehicle device 48 in response to the user operating the first operating portion 54.

In a first mode, the battery 28 supplies electric power to the human-powered vehicle device 48. The controller 52 regulates the supply of the electric power from the battery 28 to the human-powered vehicle device 48. In a case in which the first operating portion 54 is operated by a first action in the first mode, the controller 52 is configured to switch the first mode to a second mode in which electric power supplied from the battery 28 to the human-powered vehicle device 48 is less as compared to the electric power supplied in the first mode. In other words, the controller 52 is configured to switch from the first mode to the second mode upon determining the first operating portion 54 has been operated by a first action while in the first mode. In a case in which the first operating portion 54 is operated by the first action in the second mode, the controller 52 is configured not to switch the second mode to the first mode. The controller 52 is configured to switch from the first mode to the second mode upon determining the first operating portion 54 has been operated by the first action while in the second mode. In one example, the controller 52 does not supply electric power from the battery 28 to the human-powered vehicle device 48 in the second mode. In one example, the second mode includes a third mode in which the battery 28 energizes the drive circuit 58 and energization between the drive circuit 58 and the human-powered vehicle device 48 is interrupted. In this case, the first action of the first operating portion 54 is a shutdown operation that interrupts the supply of electric power from the battery 28 to the human-powered vehicle device 48. One example of the state interrupting the energization between the drive circuit 58 and the human-powered vehicle device 48 is a state in which the transistors of the drive circuit 58 are each deactivated and interrupt the energization of the inverter circuit from the battery 28. The deactivation of a transistor refers to a state in which current does not flow to the transistor. In the second mode, for example, electric power with which the human-powered vehicle device 48 cannot be actuated such as standby power can be supplied. The first action of the first operating portion 54 can be a sleep operation in which the electric power supplied from the battery 28 to the human-powered vehicle device 48 is less than that in the first mode.

In the second mode, the controller 52 is configured to select a first state in which the second mode is not switched to the first mode in a case in which the first operating portion 54 is operated by the first action, and a second state in which the second mode is switched to the first mode in a case in which the first operating portion 54 is operated by the first action. In one example, the controller 52 selects the first state and the second state in accordance with operation of a third operating portion.

The switching between the first mode and the second mode in the first state will now be described. The first mode is switched to the second mode in accordance with the following operations in addition to a case in which the first operating portion 54 is operated by the first action. The controller 52 switches from the first mode to the second mode in accordance with the first action from an external device 62. The external device 62 includes, for example, a smartphone, a tablet, and a laptop personal computer. The external device 62 is connected to the controller 52 through wired or wireless communication. In FIG. 3, the external device 62 is connected to the controller 52 through wireless communication. The first action from the external device 62 is a sleep operation in which the external device 62 is used to supply less electric power from the battery 28 to the human-powered vehicle device 48 than that in the first mode or a shutdown operation in which the external device 62 is used to interrupt the supply of electric power.

In the first mode, in a case in which the first operating portion 54 is operated by a second action that differs from the first action, the controller 52 controls the human-powered vehicle device 48. In this case, the second action of the first operating portion 54 is an operation that controls the human-powered vehicle device 48 other than the shutdown operation.

In one example, in a case in which the human-powered vehicle device 48 includes the transmission 30 and the first operating portion 54 is operated by the second action in the first mode, the controller 52 controls the electric actuator 32 for the transmission 30 to change the initial position of the movable portion 34B relative to the fixed portion 34A included in the rear derailleur 34. In another example, in a case in which the first operating portion 54 is operated by the second action in the first mode, the controller 52 can control the electric actuator 32 for the transmission 30 to change the rotation ratio of the number of rotations of the crank 12 provided on the human-powered vehicle 10 to the number of rotations of the first rotary body 22 provided on the human-powered vehicle 10.

In one example, in a case in which the human-powered vehicle device 48 includes the assist device 40 and the first operating portion 54 is operated by the second action in the first mode, the controller 52 controls the electric actuator 40A of the assist device 40 to change the assist ratio, at which propulsion of the human-powered vehicle 10 is assisted. The assist ratio is a ratio of assisting force of the electric actuator 40A to human driving force.

In one example, in a case in which the human-powered vehicle device 48 includes the electric suspension 42 and the first operating portion 54 is operated by the second action in the first mode, the controller 52 controls the electric actuator 42A of the electric suspension 42 to change the operation parameters of the electric suspension 42.

In one example, in a case in which the human-powered vehicle device 48 includes the adjustable seatpost 44 and the first operating portion 54 is operated by the second action in the first mode, the controller 52 controls the electric actuator 44A of the adjustable seatpost 44 to extend and retract the seatpost.

In one example, in a case in which the human-powered vehicle device 48 includes the front light 46F of the lighting device 46 and the first operating portion 54 is operated by the second action in the first mode, the controller 52 turns the front light 46F on or off. In one example, in a case in which the human-powered vehicle device 48 includes the tail light 46T of the lighting device 46 and the first operating portion 54 is operated by the second action in the first mode, the controller 52 turns the tail light 46T on or off. In a case in which the first operating portion 54 is operated by the second action, the controller 52 can intermittently illuminate the front light 46F or can adjust the illuminance of the front light 46F. In a case in which the first operating portion 54 is operated by the second action, the controller 52 can intermittently illuminate the tail light 46T or can adjust the illuminance of the tail light 46T.

The first action and the second action of the first operating portion 54 include multiple action processes. In a first example, the first operating portion 54 includes a single operating part 54A, and the number of times the first operating portion is operated differs between the first action and the second action. In one example, in a case in which the operating part 54A of the first operating portion 54 includes a switch, the first action is an operation of pressing the switch multiple times. In one example, the first action is an operation of pressing the switch two times. In a case in which the operating part 54A of the first operating portion 54 includes a switch, the second action is an operation of pressing the switch one time.

In a second example, the operation time of the first operating portion 54 differs between the first action and the second action. In one example, in a case in which the operating part 54A of the first operating portion 54 includes a switch, the first action is an operation of continuously pressing the switch for a predetermined amount of time. In one example, in a case in which the operating part 54A of the first operating portion 54 includes a switch, the second action is an operation of pressing the switch for less than the predetermined amount of time.

Figure 4:
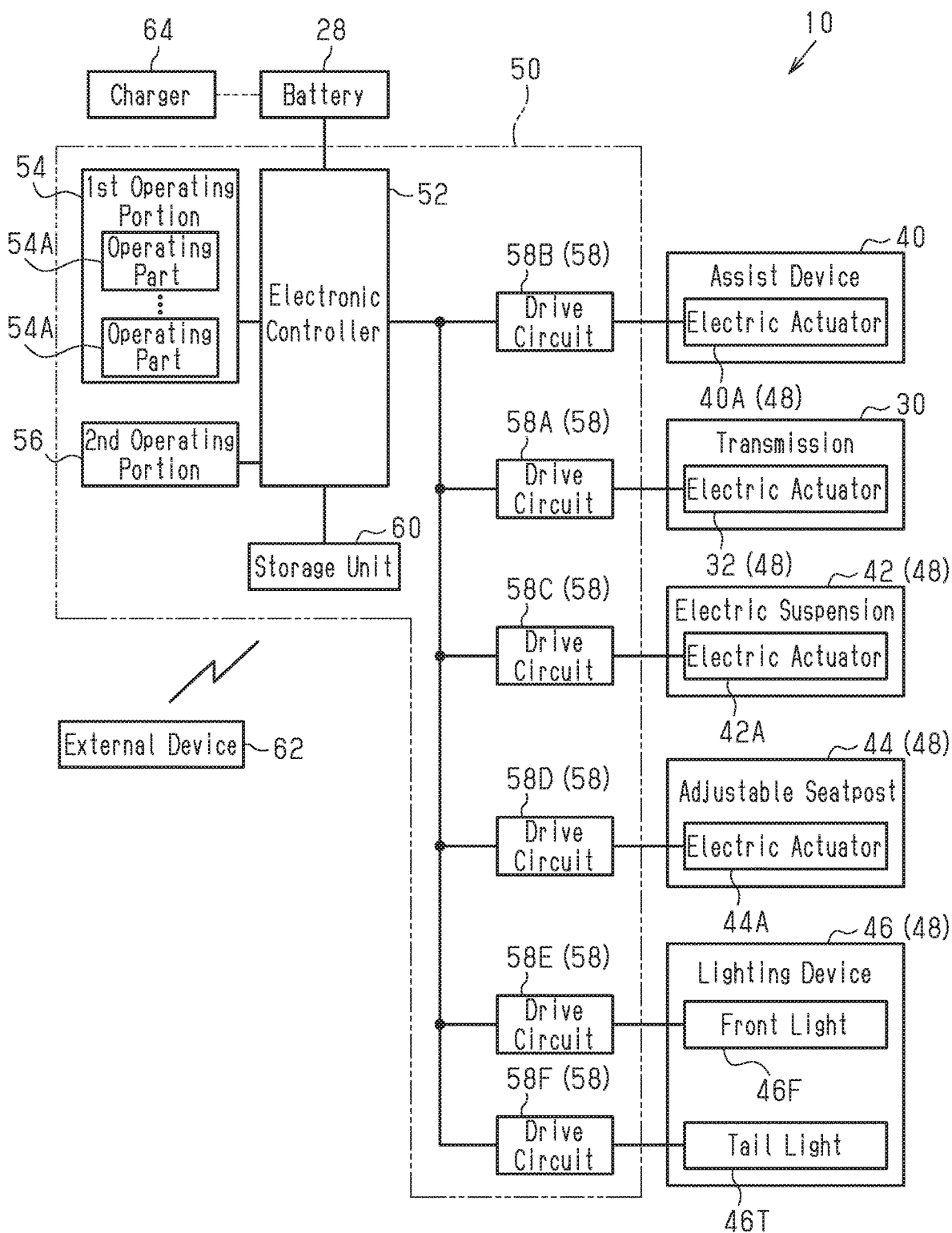
FIG. 4 is a block diagram showing another example of an electrical configuration for the human-powered vehicle shown in FIG. 1.

In a third example, as shown in FIG. 4, the first operating portion 54 includes multiple operating parts 54A, and the procedure of operating the first operating portion differs between the first action and the second action. In one example, in a case in which the operating parts 54A of the first operating portion 54 each include a switch, the first action is an operation of pressing the switches in a predetermined order. In one example, in a case in which the operating parts 54A of the first operating portion 54 each include a switch, the second action is an operation of pressing the switches in an order differing from that in the first action. In one example, one of the first action and the second action can be an operation of simultaneously pressing two or more of the switches.

The process of switching from the second mode to the first mode includes the following two processes. In a first process, in a case in which the second operating portion 56, which differs from the first operating portion 54, is operated by a third action in the second mode, the controller 52 switches the second mode to the first mode. The third action of the second operating portion 56 can be the same as the first action or the second action of the first operating portion 54 or can differ from the first action and the second action.

In a second process, in a case in which a charger 64 is electrically connected to one of the battery 28 and the human-powered vehicle device 48, the controller 52 switches from the second mode to the first mode. In one example, in a case in which the charger 64 is electrically connected to the battery 28, the charger 64 transmits a signal to the controller 52. The controller 52 switches from the second mode to the first mode in accordance with the signal from the charger 64.

The procedure of a process executed by the controller 52 in the first state will now be described with reference to FIG. 5. In a case in which electric power is supplied to the controller 52 from the battery 28, the controller 52 starts the process and proceeds to step S11 of the flowchart shown in FIG. 5. The controller 52 repeatedly executes the process shown in FIG. 5.

In step S11, the controller 52 determines whether or not the mode is the first mode. In a case in which the controller 52 determines in step S11 that the mode is the first mode, the controller 52 proceeds to step S12. In step S12, the controller 52 determines whether or not the external device 62 is operated by the first action.

In a case in which the controller 52 determines in step S12 that the external device 62 is not operated in the first action, the controller 52 proceeds to step S13. In step S13, the controller 52 determines whether or not the first operating portion 54 is operated by the first action.

In a case in which the controller 52 determines in step S12 that the external device 62 is operated by the first action or in a case in which the controller 52 determines in step S13 that the first operating portion 54 is operated by the first action, the controller 52 proceeds to step S14. The controller 52 switches to the second mode in step S14 and then proceeds to step S15.

In step S15, the controller 52 determines whether or not the second operating portion 56 is operated by the third action. In a case in which the controller 52 determines in step S15 that the second operating portion 56 is not operated by the third action, the controller 52 proceeds to step S16. In step S16, the controller 52 determines whether or not the charger 64 is electrically connected to the battery 28.

In a case in which the controller 52 determines in step S15 that the second operating portion 56 is operated by the third action or in a case in which the controller 52 determines in step S16 that the charger 64 is electrically connected to the battery 28, the controller 52 proceeds to step S17. The controller 52 switches to the first mode in step S17 and then temporarily ends the process. In a case in which the controller 52 determines in step S16 that the charger 64 is not electrically connected to the battery 28, the controller 52 temporarily ends the process.

In a case in which the controller 52 determines in step S13 that the first operating portion 54 is not operated by the first action, the controller 52 proceeds to step S18. In step S18, the controller 52 determines whether or not the first operating portion 54 is operated by the second action.

In a case in which the controller 52 determines in step S18 that the first operating portion 54 is operated by the second action, the controller 52 proceeds to step S19. In step S19, the controller 52 controls the human-powered vehicle device 48. In a case in which the controller 52 determines that the first operating portion 54 is not operated by the second action, the controller 52 temporarily ends the process.

Second Embodiment

Figure 6:
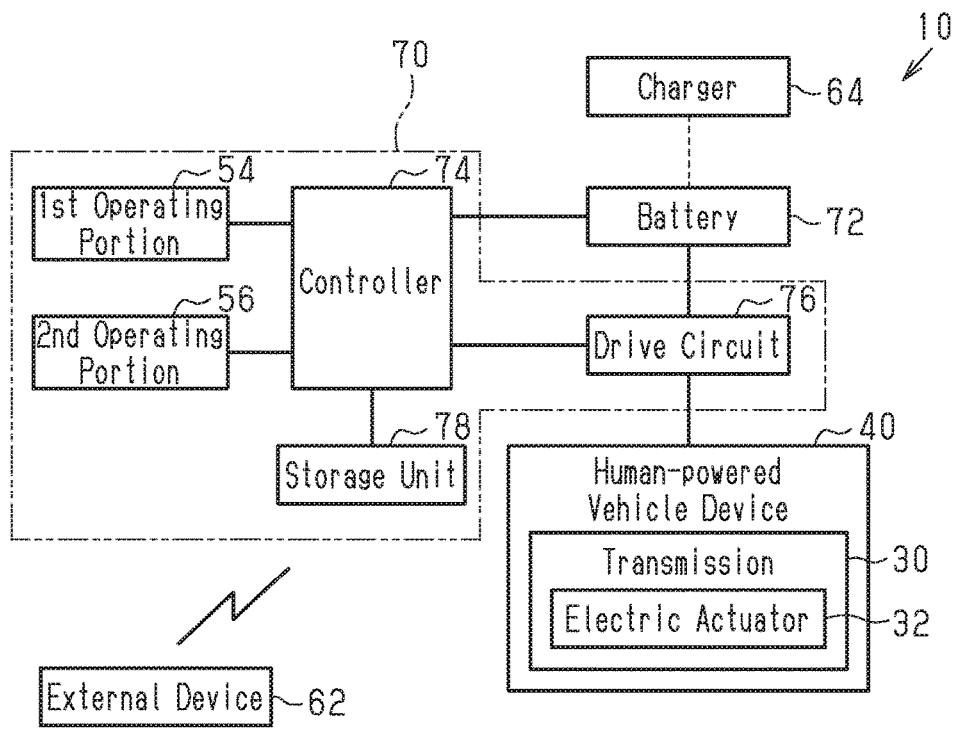
FIG. 6 is a block diagram showing one example of an electrical configuration of a human-powered vehicle including a human-powered vehicle control device in accordance with a second embodiment.

A second embodiment of a control device 70 will now be described with reference to FIG. 6. The control device 70 of the second embodiment differs from the control device 50 of the first embodiment in that the control device 70 controls only the transmission 30. In the description hereafter, the same reference characters are given to those components that are the same as the corresponding components of the first embodiment. Such components will not be described in detail.

The human-powered vehicle 10 of the present embodiment includes the control device 70 and a battery 72 instead of the control device 50 and the battery 28. The control device 70 includes the first operating portion 54 and the second operating portion 56. The first operating portion 54 of the present embodiment operates actuation of the transmission 30. The human-powered vehicle device 48 includes the transmission 30 included in the human-powered vehicle 10.

The battery 72 includes a lithium-ion battery. The battery 72 includes one or more battery cells. The battery cells include a rechargeable battery. In the present embodiment, the battery 72 is attached to the frame 16 of the human-powered vehicle 10. The battery 72 supplies electric power to the electric actuator 32 for the transmission 30, the first operating portion 54, and the second operating portion 56. The battery 72 can be attached to the exterior of the frame 16 or can be at least partially accommodated in the frame 16. At least one of the first operating portion 54 and the second operating portion 56 can incorporate a battery differing from the battery 72. In this case, the battery 72 can be configured not to supply electric power to at least one of the first operating portion 54 and the second operating portion 56.

The control device 70 includes a controller 74 and a drive circuit 76. The controller 74 includes an arithmetic processing unit that runs predetermined control programs. The arithmetic processing unit includes, for example, a CPU or an MPU. The controller 74 can include one or more microcomputers. The controller 74 is formed of one or more semiconductor chips that are mounted on a circuit board. The control device 70 includes a storage unit 78. The storage unit 78 stores information used in various control programs and various control processes. The storage unit 78 includes, for example, a nonvolatile memory and a volatile memory. The controller 74 can include the storage unit 78. The controller 74 is connected to the battery 72 and the drive circuit 76 through wired or wireless communication. The controller 74 is configured to communicate with the battery 72 and the drive circuit 76 through, for example, PLC. The battery 72 supplies electric power to the controller 74 and the drive circuit 76.

The drive circuit 76 and the drive circuit 58A of the first embodiment have the same configuration. The drive circuit 76 controls electric power supplied from the battery 72 to the electric actuator 32. The drive circuit 76 drives the electric actuator 32 in accordance with a control signal from the controller 74.

The controller 74 is connected to each of the first operating portion 54 and the second operating portion 56 through wired or wireless communication. In the case of wired communications, the controller 74 is configured to communicate with each of the first operating portion 54 and the second operating portion 56 through, for example, PLC.

In the present embodiment, the controller 74 includes the first mode, in which the battery 72 supplies electric power to the electric actuator 32, and the second mode, in which the electric power supplied from the battery 72 to the electric actuator 32 is less than that in the first mode. In one example, in the second mode, the controller 74 does not supply electric power from the battery 72 to the electric actuator 32. The second mode includes the third mode in which the battery 28 energizes the drive circuit 76 and the energization between the drive circuit 76 and the electric actuator 32 is interrupted. In the second mode of the present embodiment, the electric actuator 32 can be supplied with, for example, electric power that does not actuate the electric actuator 32 such as standby power.

The control performed by the controller 74 on the electric actuator 32 is the same as the control of the first embodiment performed by the controller 52 on the human-powered vehicle device 48. In one example, in a case in which the first operating portion 54 is operated by the first action, the controller 74 switches from the first mode to the second mode. In a case in which the first operating portion 54 is operated by the first action in the second mode, the controller 74 does not switch from the second mode to the first mode. The controller 74 switches from the first mode to the second mode in accordance with the first action from the external device 62.

In one example, in a case in which the first operating portion 54 is operated by the second action in the first mode, the controller 74 controls the electric actuator 32 to change the initial position of the movable portion 34B relative to the fixed portion 34A of the rear derailleur 34. In another example, in a case in which the first operating portion 54 is operated by the second action in the first mode, the controller 74 controls the electric actuator 32 to change the transmission ratio.

In one example, in the second mode, the controller 74 is configured to select the first state, in which the second mode is not switched to the first mode in a case in which the first operating portion 54 is operated by the first action, and the second state, in which the second mode is switched to the first mode in a case in which the first operating portion 54 is operated by the first action.

In one example, in a case in which the second operating portion 56 is operated by the third action in the second mode, the controller 74 switches the second mode to the first mode. In one example, in a case in which the charger 64 is electrically connected to the battery 72, the controller 74 switches the second mode to the first mode.

Third Embodiment

A third embodiment of a control device 50 will now be described with reference to FIGS. 7 and 8. The control device 50 of the third embodiment differs from the control device 50 of the first embodiment mainly in a subject device serving as the human-powered vehicle device 48. In the description hereafter, the same reference characters are given to those components that are the same as the corresponding components of the first embodiment. Such components will not be described in detail.

Figure 7:
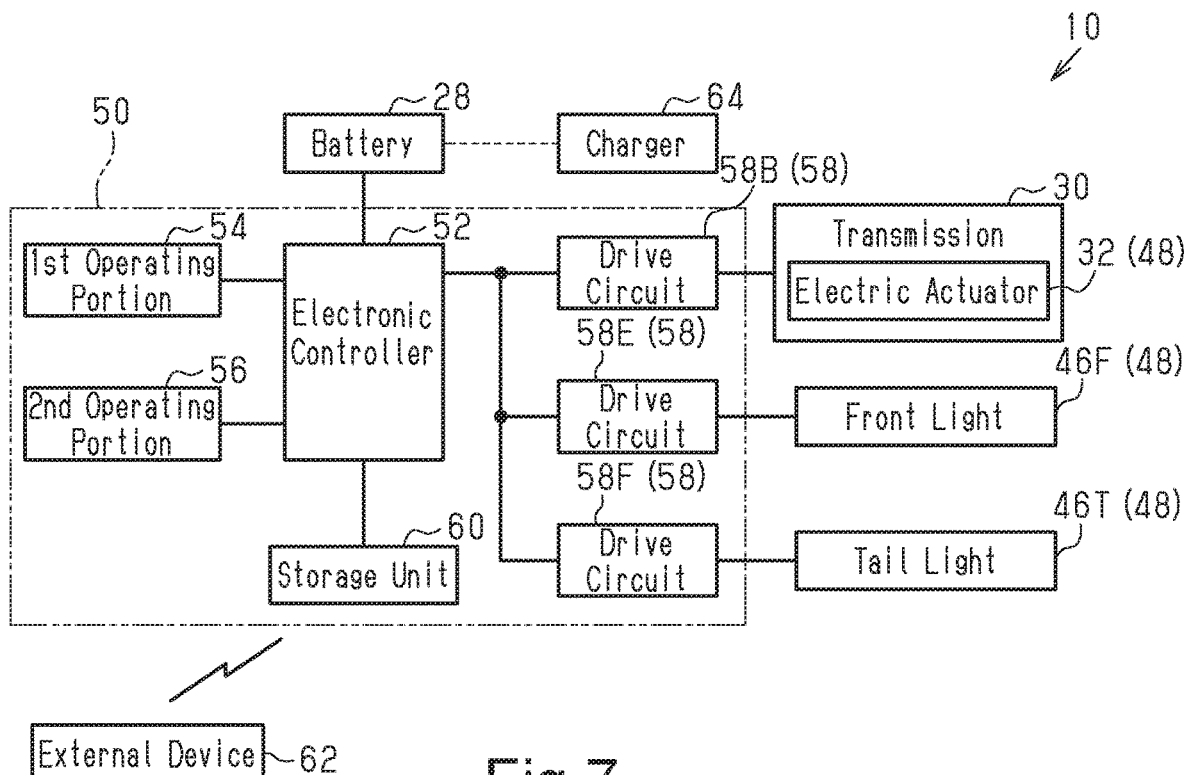
FIG. 7 is a block diagram showing one example of an electrical configuration of a human-powered vehicle including a human-powered vehicle control device in accordance with a third embodiment.

As shown in FIG. 7, the control device 50 includes the controller 52. The controller 52 switches between a first mode in which the battery 28 supplies electric power to the human-powered vehicle device 48 including at least one of the electric actuator 32, the front light 46F, and the tail light 46T, and a second mode in which electric power supplied from the battery 28 to at least one of the electric actuator 32, the front light 46F, and the tail light 46T is less than that in the first mode. In a case in which the charger 64 is connected to the battery 28, controller 52 changes from the second mode to the first mode.

In the present embodiment, the human-powered vehicle device 48 includes at least one of the electric actuator 32 for the transmission 30, the front light 46F, and the tail light 46T. The electric actuator 32 is configured to actuate the transmission 30.

As shown in FIG. 7, the control device 50 further includes the first operating portion 54 that switches from the first mode to the second mode. The control device 50 further includes the second operating portion 56 that differs from the first operating portion 54 and switches from the second mode to the first mode. The first operating portion 54 and the second operating portion 56 are connected to the controller 52 through wired or wireless communication.

In the second mode, the controller 52 does not control the mode switching in accordance with operation of the first operating portion 54. More specifically, even in a case in which the first operating portion 54 is operated by an action for the mode switching in the second mode, the controller 52 does not switch from the second mode to the first mode. In the second mode, the controller 52 switches from the second mode to the first mode in accordance with operation of the second operating portion 56.

The procedure of a process for changing from the second mode to the first mode performed by the controller 52 will now be described with reference to FIG. 8.

In step S21, the controller 52 determines whether the mode is the second mode. In a case in which the controller 52 determines in step S21 that the mode is the second mode, the controller 52 proceeds to step S22. In a case in which the controller 52 determines in step S21 that the mode is not the second mode, the controller 52 temporarily ends the process.

In step S22, the controller 52 determines whether or not the charger 64 is connected to the battery 28. In a case in which the controller 52 determines that the charger 64 is not connected to the battery 28, the controller 52 proceeds to step S23. In step S23, the controller 52 determines whether or not the second operating portion 56 is operated. In a case the controller 52 receives an operation signal from the second operating portion 56, the controller 52 determines that the second operating portion 56 is operated.

In a case in which the controller 52 determines in step S22 that the charger 64 is connected to the battery 28 or in a case in which the controller 52 determines in step S23 that the second operating portion 56 is operated, the controller 52 proceeds to step S24. The controller 52 changes from the second mode to the first mode in step S24 and then temporarily ends the process. In a case in which the controller 52 determines in step S23 that the second operating portion 56 is not operated, the controller 52 temporarily ends the process.

Modifications

The description related to the embodiments exemplifies, without any intention to limit, applicable forms of a human-powered vehicle control device according to the present disclosure. The human-powered vehicle control device according to the present disclosure is applicable to, for example, the modifications of the embodiments that are described below and combinations of at least two of the modifications that do not contradict each other. In the following modifications, the same reference characters are given to those components that are the same as the corresponding components of the embodiments. Such components will not be described in detail.

Figure 9:
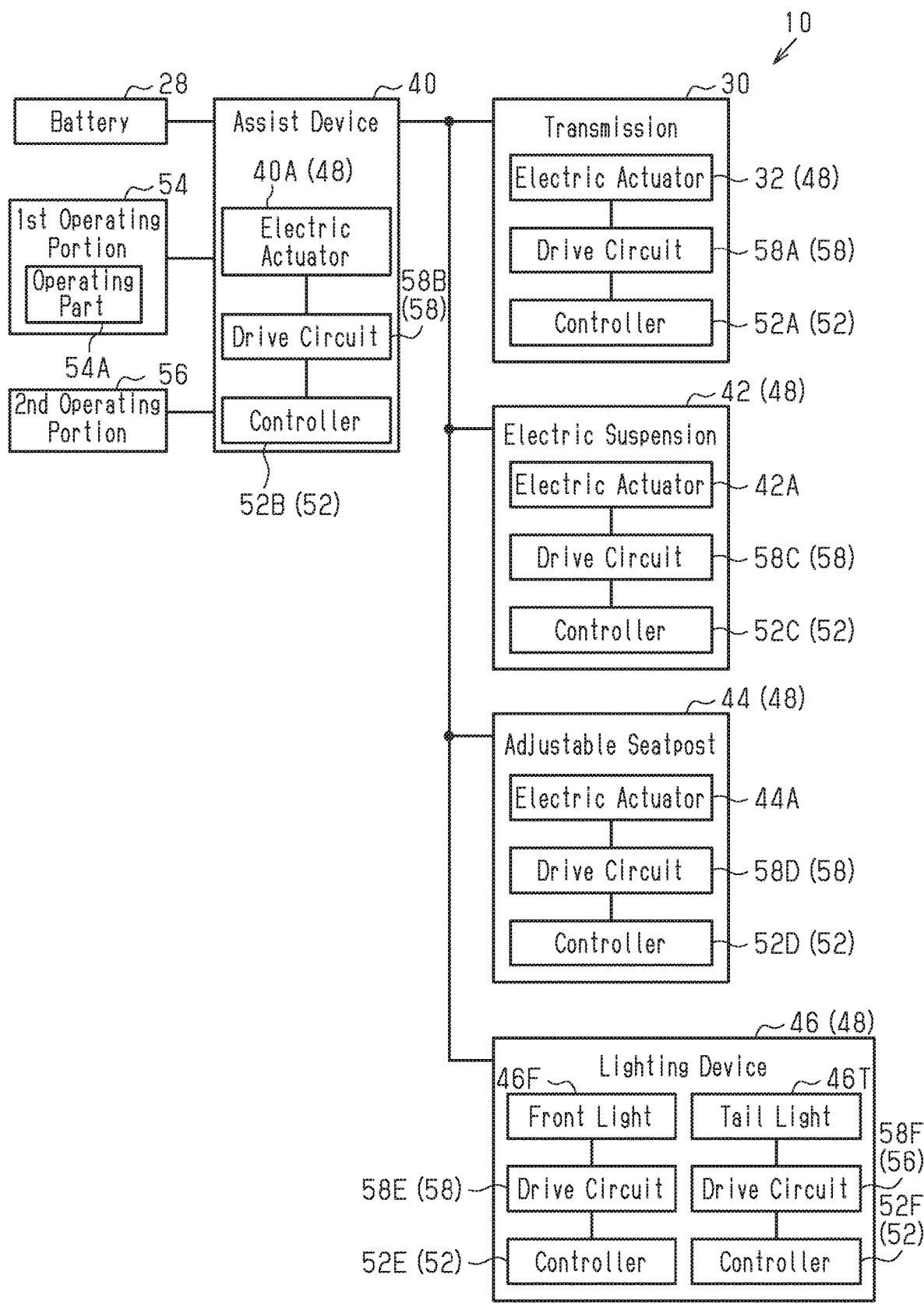
FIG. 9 is a block diagram showing one example of an electrical configuration of a human-powered vehicle including a modification of a human-powered vehicle control device.

In the first embodiment, at least one of the assist device 40, the transmission 30, the electric suspension 42, the adjustable seatpost 44, and the lighting device 46 can include the controller 52. In one modification, as shown in FIG. 9, the assist device 40, the transmission 30, the electric suspension 42, the adjustable seatpost 44, and the lighting device 46 each include the controller 52. The controller 52 includes controllers 52A to 52F. The controller 52A controls the electric actuator 32 of the transmission 30. The controller 52B controls the electric actuator 40A of the assist device 40. The controller 52C controls the electric actuator 42A of the electric suspension 42. The controller 52D controls the electric actuator 44A of the adjustable seatpost 44. The controller 52E controls the turning on and off of the front light 46F. The controller 52E can intermittently illuminate the front light 46F and adjust the illuminance of the front light 46F. The controller 52F controls the turning on and off of the tail light 46T. The controller 52F can intermittently illuminate the tail light 46T and adjust the illuminance of the tail light 46T. The controllers 52A and 52C to 52F are connected to the controller 52B through wired or wireless communication. In one modification, the controllers 52A and 52C to 52F are configured to communicate with the controller 52B through PLC. The controllers 52A and 52C to 52F can be configured to communicate with each other through wired or wireless communication. In one modification, the controllers 52A and 52C to 52F are configured to perform wireless communicate with each other.

In FIG. 9, the battery 28 supplies electric power via the assist device 40 to the electric actuator 32 and the drive circuit 58A of the transmission 30, the electric actuator 42A and the drive circuit 58C of the electric suspension 42, the electric actuator 44A and the drive circuit 58D of the adjustable seatpost 44, and the drive circuits 58E and 58F of the lighting device 46. The first operating portion 54 and the second operating portion 56 are each connected to the controller 52B of the assist device 40 through wired or wireless communication. The first operating portion 54 and the second operating portion 56 can transmit operation signals to the controllers 52A and 52C to 52F through the controller 52B.

In a case in which the human-powered vehicle device 48 includes the electric actuator 40A of the assist device 40, the control device 50 includes the controller 52B. In a case in which the human-powered vehicle device 48 includes the electric suspension 42, the control device 50 includes the controller 52C. In a case in which the human-powered vehicle device 48 includes the adjustable seatpost 44, the control device 50 includes the controller 52D. In a case in which the human-powered vehicle device 48 includes the front light 46F of the lighting device 46, the control device 50 includes the controller 52E. In a case in which the human-powered vehicle device 48 includes the tail light 46T of the lighting device 46, the control device 50 includes the controller 52F.

In the first embodiment, a battery for the electric actuator 32 of the transmission 30 can be provided separately from the battery 28. The battery for the electric actuator 32 is provided, for example, on the frame 16 of the human-powered vehicle 10.

Figure 5:
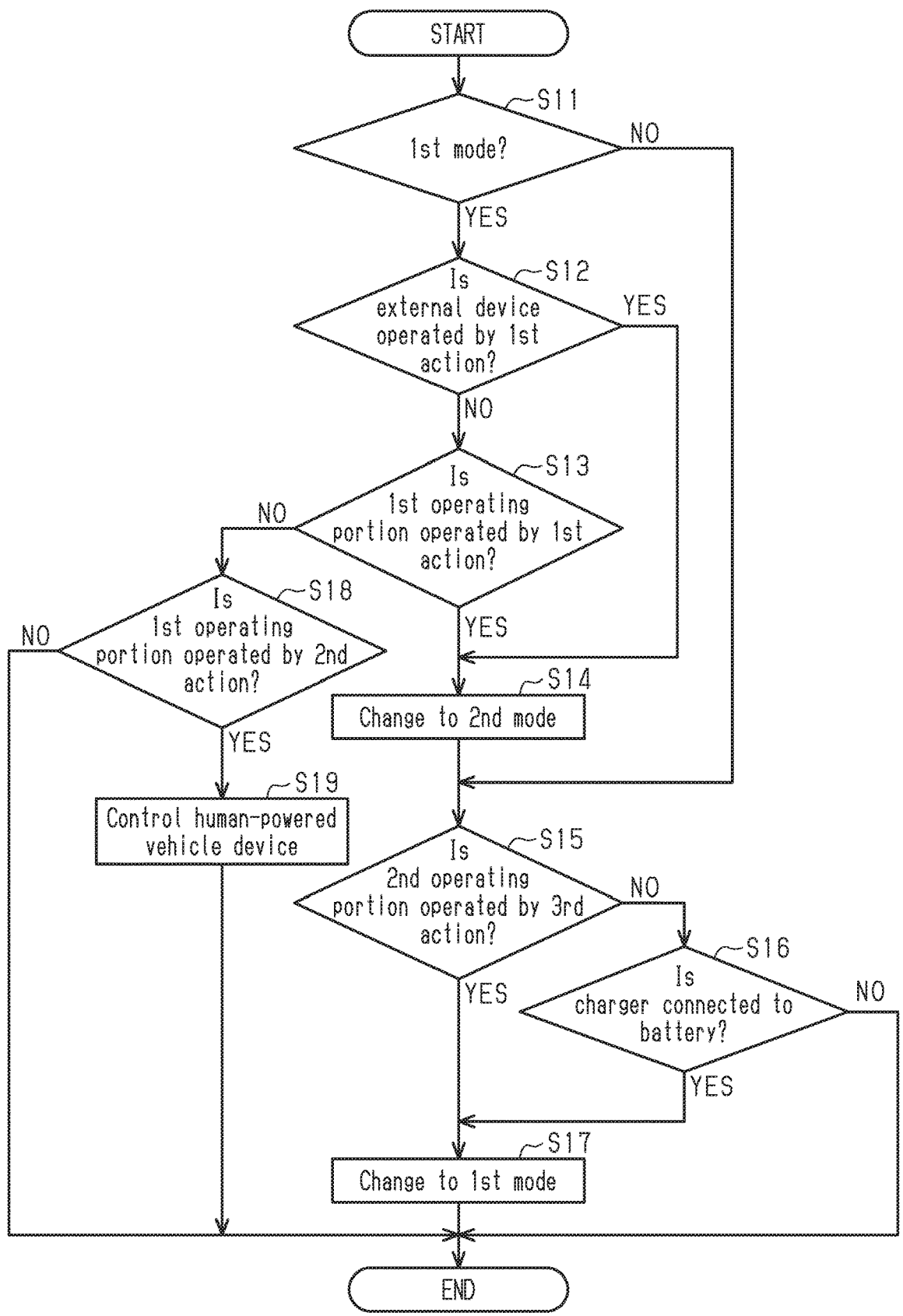
FIG. 5 is a flowchart showing one example of a control procedure of a process executed by an electronic controller of the human-powered vehicle control device.

In the first and second embodiments, step S12 can be omitted from the flowchart shown in FIG. 5. In this case, in a case in which the controller 52 determines in step S11 that the mode is the first mode, the controller 52 proceeds to step S13.

In the first and second embodiments, step S12 and step S13 can be switched in the flowchart in FIG. 5. In this case, in a case in which the controller 52 determines in step S12 that the first operating portion 54 is not operated by the first action, the controller 52 proceeds to step S18. In a case in which the controller 52 determines in step S13 that the external device 62 is not operated by the first action, the controller 52 temporarily ends the process.

In the first and second embodiments and the modifications, step S16 can be omitted from the flowchart shown in FIG. 5. In this case, in a case in which the controller 52 determines in step S15 that the second operating portion 56 is not operated by the third action, the controller 52 temporarily ends the process. More specifically, only in a case in which the second operating portion 56 is operated by the third action, the controller 52 changes from the second mode to the first mode.

In the first and second embodiments and the modifications, step S15 and step S16 can be switched in the flowchart shown in FIG. 5.

In the first and second embodiments and the modifications, step S15 of the flowchart shown in FIG. 5 can be changed so that whether or not the charger 64 is connected to the battery 28 is determined. In this case, step S16 is omitted from the flowchart shown in FIG. 5. In this case, only in a case in which the charger 64 is connected to the battery 28, the controller 52 changes from the second mode to the first mode.

The electric actuator included in the human-powered vehicle device 48 of the third embodiment is not limited to the electric actuator 32 for the transmission 30. In one modification, the human-powered vehicle device 48 can include at least one of the electric actuator 40A of the assist device 40, the electric actuator 42A of the electric suspension 42, and the electric actuator 44A of the adjustable seatpost 44.

Figure 8:
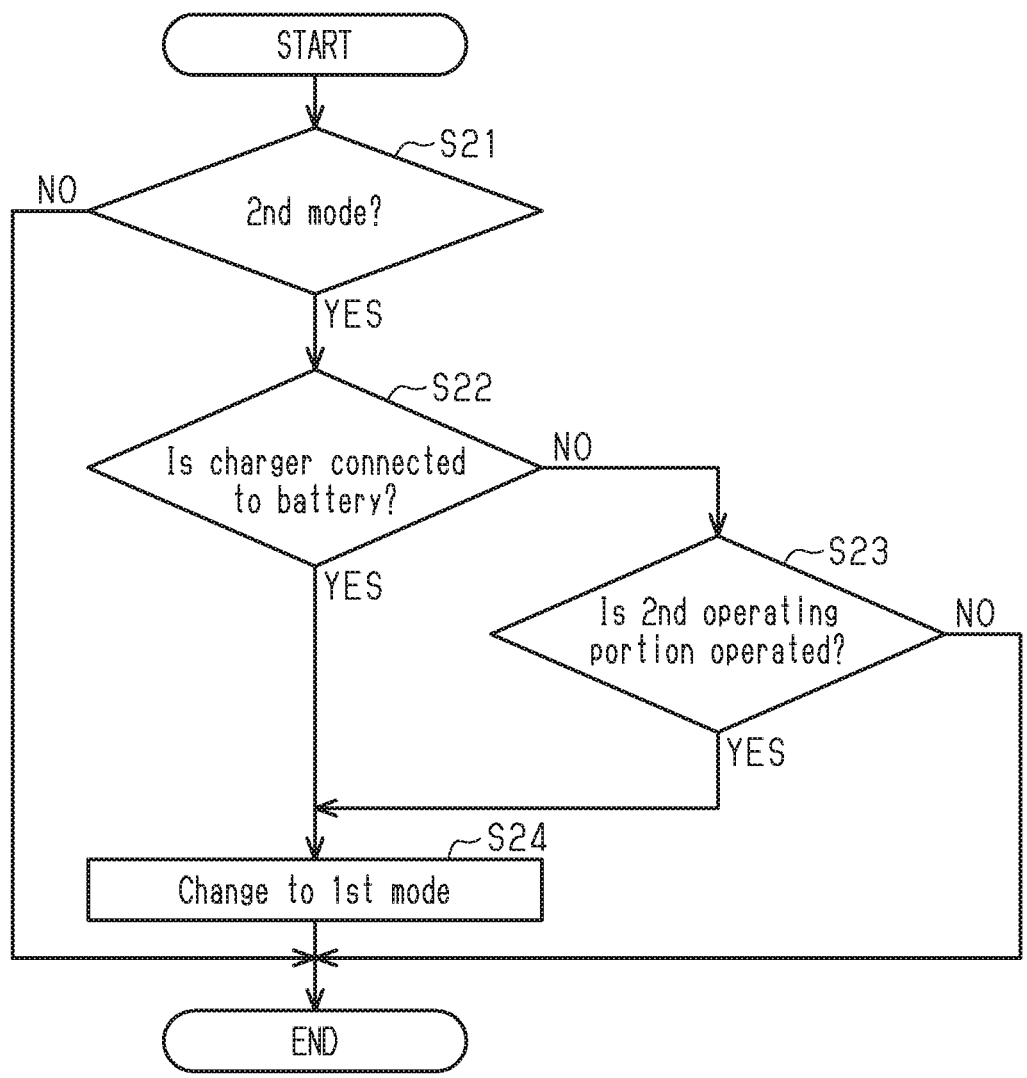
FIG. 8 is a flowchart showing one example of a control procedure of a process executed by the electronic controller of the human-powered vehicle control device.
Figure 10:
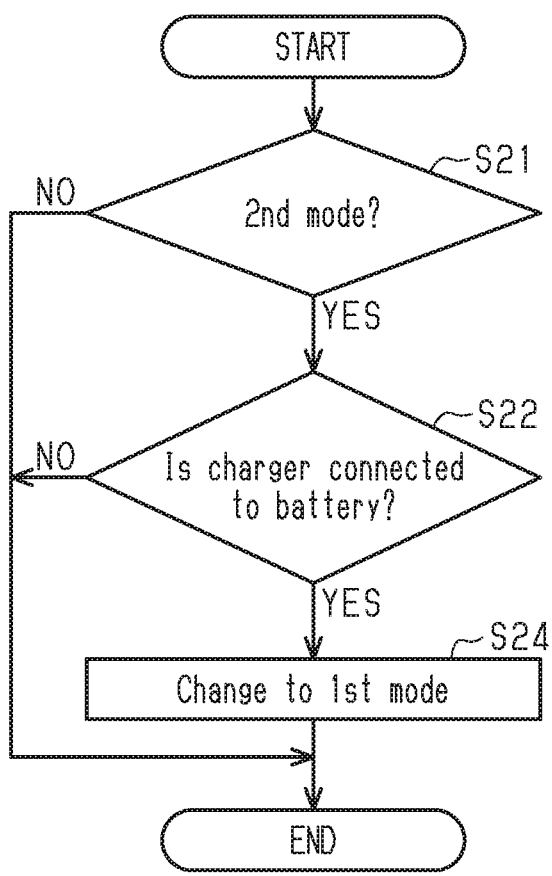
FIG. 10 is a flowchart showing one example of a control procedure of a process executed by the electronic controller in a modification of a human-powered vehicle control device.

In the third embodiment, step S23 can be omitted from the flowchart shown in FIG. 8. In this case, as shown in FIG. 10, in a case in which the controller 74 determines in step S22 that the charger 64 is not connected to the battery 72, the controller 74 temporarily ends the process.

In the embodiments and the modifications, the location where the batteries 28 and 72 are attached to the human-powered vehicle 10 can be changed in any manner. In one modification, the batteries 28 and 72 can be attached to at least one of the seatpost 44B, the movable portion 34B or the fixed portion 34A of the rear derailleur 34, and the frame 16 of the human-powered vehicle 10.

In the embodiments and the modifications, the human-powered vehicle 10 can be configured to include a front derailleur. The electric actuator 32 for the transmission 30 can be configured to change the initial position of a movable portion relative to a fixed portion of the front derailleur. In one modification, in a case in which the first operating portion 54 is operated by the second action, the controllers 52 and 74 control the electric actuator 32 to change the initial position of the movable portion relative to the fixed portion of the front derailleur. The movable portion of the front derailleur can be actuated by an electric actuator differing from the electric actuator 32. The human-powered vehicle 10 can be configured not to include an electric actuator that changes the initial position of the movable portion relative to the fixed portion of the front derailleur. In this case, instead of the second action of the first operating portion 54, the user can use, for example, a tool to adjust the initial position of the movable portion relative to the fixed portion of the front derailleur. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

What is claimed is:

1. A human-powered vehicle control device comprising:
an electronic controller configured to control a supply of electric power from a battery to a human-powered vehicle device; and
a first operating portion that operates the human-powered vehicle device,
the electronic controller being further configured to control the supply of electric power supplied from the battery to the human-powered vehicle device in a first mode,
the electronic controller being further configured to control the supply of the electric power supplied from the battery to the human-powered vehicle device while in a second mode to be less as compared to the electric power supplied in the first mode,
the electronic controller being further configured to switch from the first mode to the second mode upon determining the first operating portion has been operated by a first action while in the first mode, and
the electronic controller being further configured not to switch from the second mode to the first mode upon determining the first operating portion has been operated by the first action while in the second mode.

2. The human-powered vehicle control device according to claim 1, wherein
the human-powered vehicle device includes at least one of an electric actuator for a transmission included in a human-powered vehicle, a lighting device provided on the human-powered vehicle, an electric suspension included in the human-powered vehicle, an adjustable seatpost included in the human-powered vehicle, and an electric actuator that assists in propulsion of the human-powered vehicle.

3. The human-powered vehicle control device according to claim 1, wherein
the electronic controller is further configured to control the human-powered vehicle device upon determining the first operating portion has been operated by a second action that differs from the first action while in the first mode.

4. The human-powered vehicle control device according to claim 3, wherein
the human-powered vehicle device includes a rear derailleur and an electric actuator,
the rear derailleur includes a movable portion and a fixed portion, and
the electronic controller is further configured to control the electric actuator to change an initial position of the movable portion relative to the fixed portion upon determining the first operating portion has been operated by the second action while in the first mode.

5. The human-powered vehicle control device according to claim 3, wherein
the first operating portion includes a single operating part, and
the electronic controller is further configured to distinguish the first action and the second action based on a number of times the first operating portion is operated, which differs between the first action and the second action.

6. The human-powered vehicle control device according to claim 3, wherein
the first operating portion includes a plurality of operating parts, and
the electronic controller is further configured to distinguish the first action and the second action based on an operating procedure for operating the operating parts, which differs between the first action and the second action.

7. The human-powered vehicle control device according to claim 3, wherein
the electronic controller is further configured to distinguish the first action and the second action based on an operation time of the first operating portion, which differs between the first action and the second action.

8. The human-powered vehicle control device according to claim 1, wherein
the electronic controller is further configured to switch from the second mode to the first mode upon determining a second operating portion that differs from the first operating portion is operated by a third action while in the second mode.

9. The human-powered vehicle control device according to claim 1, wherein
the electronic controller is further configured to switch from the second mode to the first mode upon determining a charger is electrically connected to one of the battery and the human-powered vehicle device.

10. The human-powered vehicle control device according to claim 1, wherein
the electronic controller is further configured to select between a first state and a second state while in the second mode,
the electronic controller is further configured not to switch from the second mode to the first mode in a case in which the first operating portion is operated by the first action while in the first state, and
the electronic controller is further configured to switch from the second mode to the first mode in a case in which the first operating portion is operated by the first action while in the second state.

11. A human-powered vehicle control device comprising:
an electronic controller configured to switch between a first mode and a second mode,
the electronic controller being further configured to control a supply of electric power supplied from a battery to a human-powered vehicle device that includes at least one of an electric actuator, a front light, and a tail light while in the first mode,
the electronic controller being further configured to control the supply of the electric power supplied from the battery to at least one of the electric actuator, the front light, and the tail light while in the second mode to be less as compared to the electric power supplied in the first mode, and
the electronic controller being further configured to switch from the second mode to the first mode upon determining a charger is connected to the battery.

12. The human-powered vehicle control device according to claim 11, wherein
the electric actuator is configured to actuate a transmission.

13. The human-powered vehicle control device according to claim 11, further comprising
a first operating portion that switches from the first mode to the second mode,
the electronic controller is further configured not to switch from the first mode to the second mode in accordance with operation of the first operating portion while in the second mode.

14. The human-powered vehicle control device according to claim 13, further comprising
a second operating portion that switches from the second mode to the first mode and differs from the first operating portion,
the electronic controller is further configured to switch from the second mode to the first mode in accordance with operation of the second operating portion while in the second mode.

15. The human-powered vehicle control device according to claim 1, wherein
the first operating portion is configured to be mounted on a human-powered vehicle.

16. The human-powered vehicle control device according to claim 1, wherein
the electronic controller is further configured to switch from the first mode to the second mode in accordance with a first action from an external device.

17. The human-powered vehicle control device according to claim 1, further comprising
a drive circuit that drives the human-powered vehicle device, the second mode includes a third mode in which the battery energizes the drive circuit and energization between the drive circuit and the human-powered vehicle device is interrupted.

18. The human-powered vehicle control device according to claim 1, wherein
the battery includes a lithium-ion battery.

19. The human-powered vehicle control device according to claim 1, wherein
the battery is attachable to at least one of a seatpost, a movable portion of a rear derailleur, a fixed portion of the rear derailleur, and a frame of a human-powered vehicle.

20. The human-powered vehicle control device according to claim 1, wherein
the electronic controller is further configured not to supply the electric power from the battery to the human-powered vehicle device while in the second mode.

* * * * *